(12) United States Patent
Challapali et al.

(10) Patent No.: US 8,284,755 B2
(45) Date of Patent: Oct. 9, 2012

(54) SYNCHRONIZATION OF DISTRIBUTED NETWORKS

(75) Inventors: Kiran S. Challapali, New City, NY (US); Carlos M. Cordeiro, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 844 days.

(21) Appl. No.: 12/280,226

(22) PCT Filed: Feb. 21, 2007

(86) PCT No.: PCT/IB2007/050559
§ 371 (c)(1),
(2), (4) Date: Aug. 21, 2008

(87) PCT Pub. No.: WO2007/096823
PCT Pub. Date: Aug. 30, 2007

(65) Prior Publication Data
US 2009/0041003 A1 Feb. 12, 2009

Related U.S. Application Data

(60) Provisional application No. 60/776,182, filed on Feb. 23, 2006, provisional application No. 60/817,594, filed on Jun. 28, 2006.

(51) Int. Cl.
*H04J 3/06* (2006.01)

(52) U.S. Cl. .................................................. 370/350

(58) Field of Classification Search .............. 370/310.1, 370/310.2, 314, 324, 328, 350, 395.62, 503–520; 455/13.2, 502, 208, 265
See application file for complete search history.

(56) References Cited

U.S. PATENT DOCUMENTS

| | | | |
|---|---|---|---|
| 7,492,736 B2* | 2/2009 | Ho | 370/329 |
| 7,957,342 B2* | 6/2011 | Ohmi et al. | 370/328 |
| 2005/0090200 A1* | 4/2005 | Karaoguz et al. | 455/41.2 |
| 2007/0025384 A1* | 2/2007 | Ayyagari et al. | 370/445 |
| 2008/0298329 A1* | 12/2008 | Mo et al. | 370/338 |

FOREIGN PATENT DOCUMENTS
WO WO2005076544 A1 8/2005

OTHER PUBLICATIONS

Chou et al., "Mobility Support Enhancements for the WiMedia UWB MAC Protocol", Broadband Networks, 2005 2nd International Conference on Boston, MA, Oct. 2005, pp. 213-219, XP010890344.

* cited by examiner

*Primary Examiner* — Kwang B Yao
*Assistant Examiner* — Tung Q Tran
(74) *Attorney, Agent, or Firm* — Larry Liberchuk

(57) ABSTRACT

A system (400), apparatus (300), and method (100) are provided to synchronize distributed (otherwise uncoordinated) networks (400) of independent nodes (401$_i$). Such synchronization can be used in a number of different ways. In the context of cognitive radios, such synchronization can be used to synchronize quiet periods. Quiet periods are times when all cognitive radios (that are otherwise uncoordinated) become quiet so that incumbent users can be detected reliably. The technique of the present invention converges quickly and scales well.

9 Claims, 5 Drawing Sheets

SYNCHRONIZATION OF DISTRIBUTED NETWORKS

The present invention relates to a system, apparatus and method that synchronizes beacon periods in distributed, otherwise uncoordinated networks. More particularly, the present invention relates to synchronization enabling better coexistence among cognitive radio networks.

Several approaches to synchronization exist. However, their scalability to large wireless networks of uncoordinated networks/devices/nodes/stations has never been proven.

A convergent and scalable solution is needed to allow otherwise uncoordinated networks/devices/nodes/stations to quickly become coordinated for such uses as sharing the wireless medium for coexistence among like devices/nodes/stations ("secondary sharing") or the coordination of quiet periods so that all like devices are quiet at the same time so that an out-of-network emitter can be more robustly and quickly detected ("primary sharing").

The system, apparatus, and method of the present invention provide an efficient algorithm that is guaranteed to synchronize otherwise uncoordinated networks of wireless networks/devices/nodes/stations. Hereinafter, for discussion purposes only, the devices/nodes/stations are referred to only as nodes but no limitation is thereby implied.

In a preferred embodiment, each node j of an otherwise uncoordinated network is modified with the present invention to perform an identical synchronization algorithm. Each node j issues a beacon, within which it embeds its Beacon Period Start Time ($BPST_j$). When node j receives and successfully decodes a beacon sent by node i, then node i is within node j's neighborhood and the node i is considered to be a neighbor node of node j. Upon detecting such a neighbor node i, each node j performs at least one iteration of the synchronization algorithm of a preferred embodiment with respect to the detected neighbor node i. The node j locally maintains statistics for the detected neighbor node i including a Beacon Period Start Time of node i ($BPST_i$) and a counter of the number of iterations of the algorithm that has been performed by node j for each detection of a given neighbor node i. The present invention provides a technique for each node j to either adjust its own $BPST_j$ to be identical to $BPST_i$ whenever it determines that its own beacon start time is in the first half of the beacon period of a detected node i or to increment a counter unique to the node i and try to adjust again. The node j does this determination and incrementation a pre-determined maximum number of times (kept track of by the counter) and when the maximum number is reached without aligning its $BPST_j$ to node i's $BPST_i$, node j sets its $BPST_j$ to a random number and deletes all locally maintained statistics for the detected node i. The detection and subsequent iteration process of the present invention can then take place provided node j detects node i again in node j's neighborhood.

Each node j in a given neighborhood is performing the same algorithm and adjusting its own $BPST_j$ depending on the relative position of its Beacon Period Start Time to that of each detected other node i in the given neighborhood.

The Beacon Period Start Times of the uncoordinated nodes converge to a common start time very quickly, regardless of the number of uncoordinated nodes in a particular neighborhood. That is, the algorithm scales well.

Figure 1:
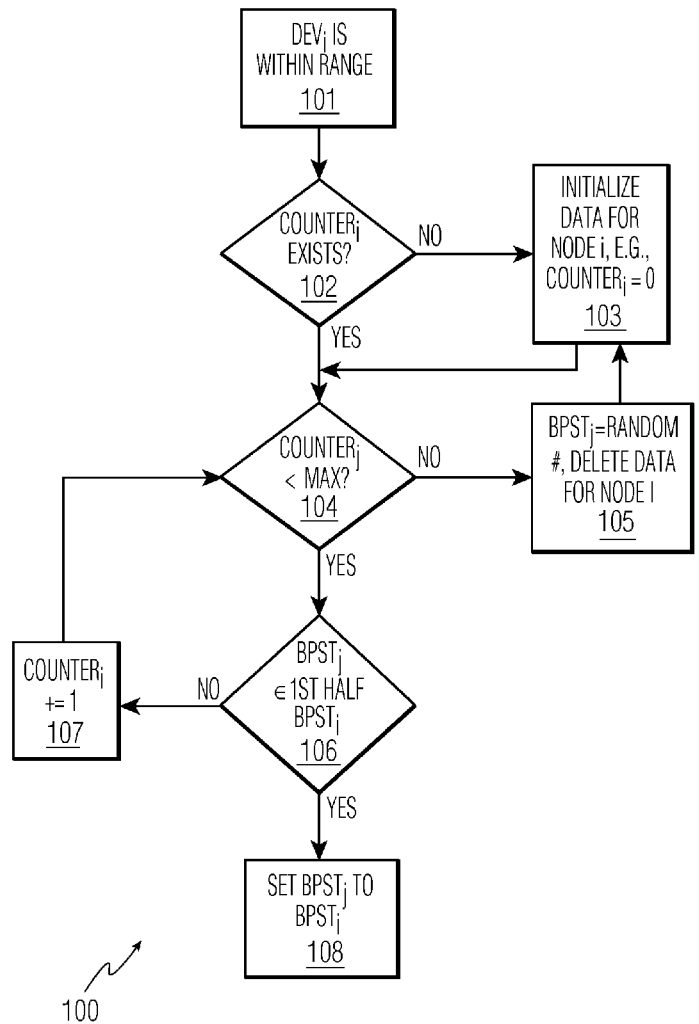
FIG. 1 illustrates a method for synchronizing otherwise uncoordinated distributed networks, according to the present invention.

The present invention can be readily understood by one skilled in the art in view of the following detailed description with reference to the accompany drawings presented only for illustrative purposes. In the drawings, the same reference symbol denotes identical components in order to eliminate redundant description thereof.

The system, apparatus, and method of the present invention for synchronizing otherwise uncoordinated wireless nodes employs a distributed scheme which may be based, for example, on organizing channel time into fixed-length superframes of a pre-determined duration. At the beginning of each such superframe a Beacon Period is allocated during which all coordinated nodes exchange Beacons. The Beacon provides a fundamental "notification of node existence" mechanism or node "heart-beat". Uncoordinated nodes sense the medium and send their Beacons making use of otherwise unused channel capacity. When Beacons of other uncoordinated nodes are detected, all of these otherwise uncoordinated nodes perform the method of the present invention to coordinate their Beacon Period Start Time within an agreed-upon fixed-length superframe having an initial Beacon Period. That is, each uncoordinated station uses the technique of the present invention to independently adjust its own superframe start time (same as Beacon Period Start Time since the Beacon Period appears at the start of each superframe). Techniques are well known for allocating a unique time within a Beacon Period at which a device sends its Beacon, as one skilled in the art is aware and are not discussed herein. The superframe is an example of an overall coordination means among nodes and is not meant to be limiting in any sense in the present invention which is described in the appended claims without any reference to superframe.

Referring now to FIG. 1, an instance of a method according to the present invention is illustrated. Given a node j and at least one node i detected at step 101 within a predetermined neighborhood of node j, i.e., within radio range of node j and being able to decode j's beacon, at step 102 the node j checks to determine if a counter exists locally for the node i. If no such counter exists, at step 103 node j initiates a counter for node i to zero. At step 104 node j determines if the counter for node j has reached the maximum MAX, i.e., has node j attempted to adjust its $BPST_j$ relative to node i a MAX number of times. That is, has the adjustment algorithm of the present invention been performed a pre-determined MAX number of times by node j with respect to node i. Note, that the iterating with respect to node i is performed all at one time (e.g., only, by a then current instance of the present invention) with the further detection of node i being disabled whenever the iterating according to the present invention is being performed by node j and is re-enabled when the then current instance of the method of the present invention ends (instantiation is not shown in FIG. 1 since it is only an example of how to implement the present invention). If the adjustment has been attempted MAX number of times without success then at step 105 node j resets its $BPST_j$ to a random start time, deletes any locally maintained data for node i (e.g., only, and enables detection of node i and ends the then active instance of the present invention).

Figure 2:
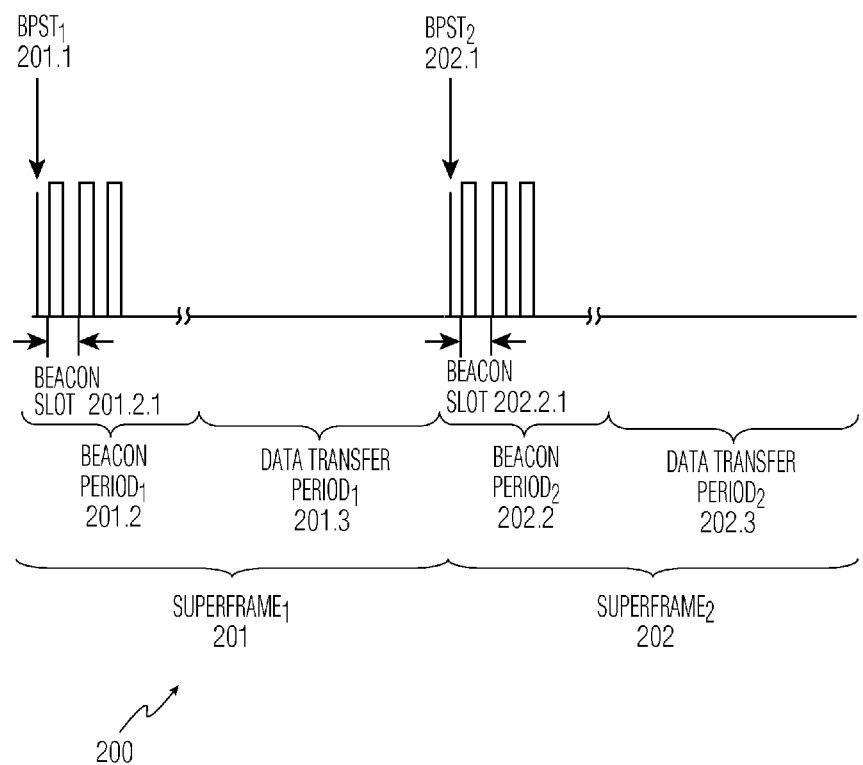
FIG. 2 illustrates a framework used as an example only to synchronize uncoordinated networks of nodes, according to the present invention.

By way of example only, FIG. 2 illustrates a sequence 200 of superframes 20$i$ each having a Beacon Period Start Time BPST$_i$ 20$i$.1 with an associated Beacon Period 20$i$.2. In this example, each Beacon Period 20$i$.2 has a number of Beacon Slots 20$i$.2.$k$ during which nodes transmit their beacons, for example, each slot being associated with one node, and thus achieving coordination of the otherwise uncoordinated network of nodes. In order to thus coordinate transmissions, Beacon Periods must be started by each node at the same time, i.e., each node must have the same Beacon Period Start Time for the next superframe. The present invention provides a synchronization method that converges quickly and scales well. Again, the superframe is only an example of a coordination mechanism and is not presented in any limiting sense. Only, the technique for synchronization of the start of a Beacon Period is being disclosed as the present invention.

Figure 3:
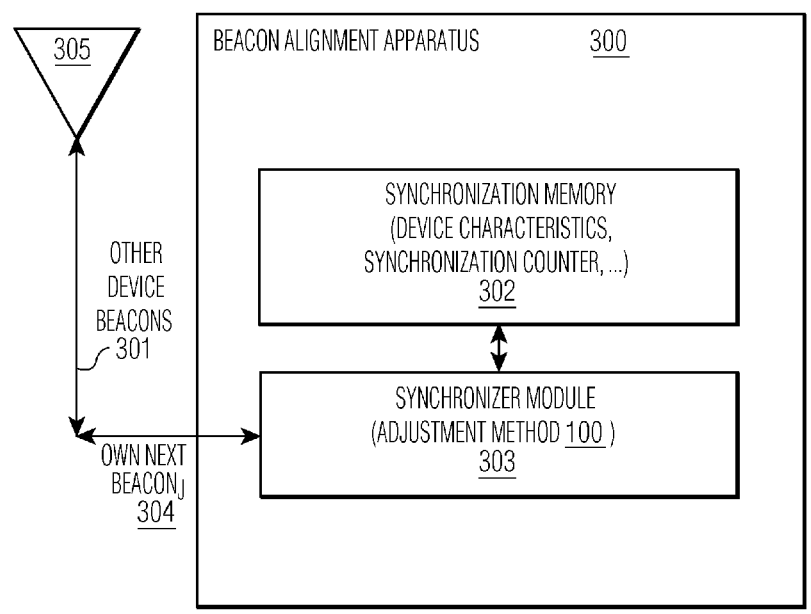
FIG. 3 illustrates an apparatus to synchronize uncoordinated networks of nodes, according to the present invention.

FIG. 3 illustrates a Beacon Alignment Apparatus 300 comprising a Synchronization Memory 302 for storing locally by node j data for detected node(s) i and a Synchronizer Module 303 for performing the method 100 of the present invention. The Beacon Alignment Apparatus 300 is operably connected to an antenna 305 for receipt of other device beacons 301, i.e., beacon of detected node i in the neighborhood of node j. Synchronizer Module 303 performs the method 100 of the present invention to result in a possible adjustment of BPST$_j$. The Beacon Alignment Apparatus 300 is operably connected to antenna 305 for transmitting own Beacon$_j$ 304 at (the possibly adjusted) own BPST$_j$.

Figure 4:
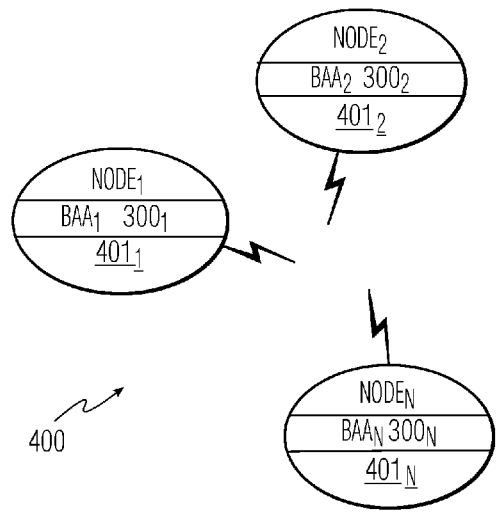
FIG. 4 illustrates a system for synchronizing beacon start times of uncoordinated nodes, in accordance with the present invention.

Referring now to FIG. 4, a system comprising a network 400 of uncoordinated nodes 401$_i$ is illustrated each being modified according to the present invention with Beacon Alignment Apparatus 300$_i$ such that by being within radio range of one another and receiving beacons from one another, the nodes 401$_i$ can each perform the method 100 of the present invention and thereby become coordinated with respect to their Beacon Period Start Times.

Figure 5:
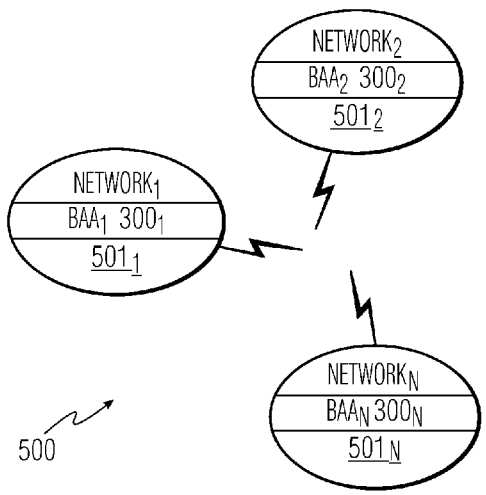
FIG. 5 illustrates convergence and scalability of the technique of the present invention.

Furthermore, referring now to FIG. 5, a group of networks 500 consisting of uncoordinated networks 501$i$ is illustrated each being modified according to the present invention with Beacon Alignment Apparatus 300$i$ such that by being within radio range of one another, the networks 501$i$ can each perform the method 100 of the present invention and thereby become coordinated with respect to their Beacon Period Start Times. This scenario is especially applicable if a network uses a Time-Division-Multiple-Access (TDMA) access mechanism (such as in IEEE 802.15, IEEE 802.16, or IEEE 802.22).

Figure 6:
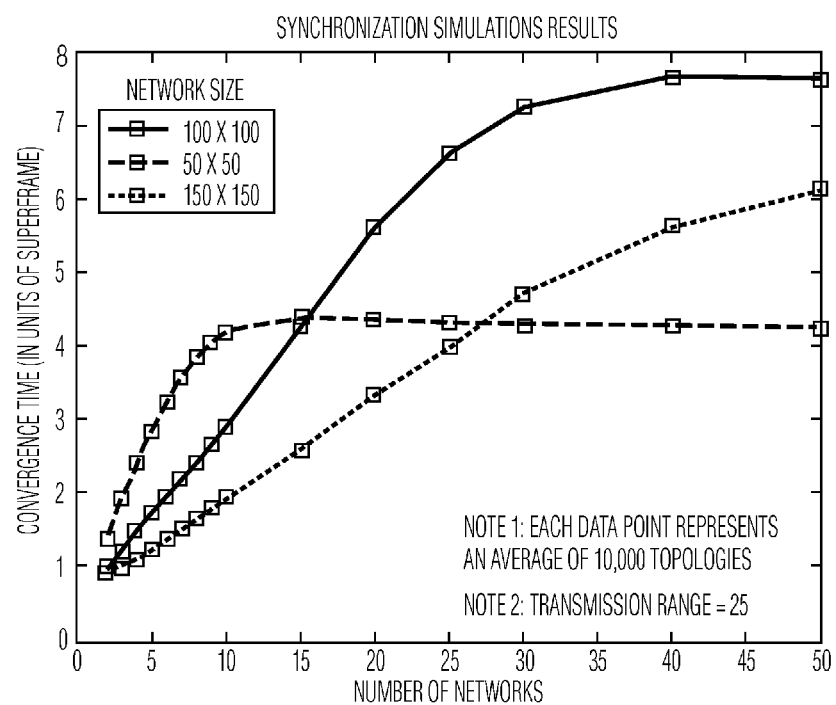
FIG. 6 illustrates simulation results of a synchronization algorithm of an embodiment of the present invention.

FIG. 6 illustrates results of extensive simulation of this synchronization algorithm, showing strong inherent stability for convergence and scalability. As shown, inherently, the synchronization technique of the present invention is very stable, meaning all the nodes converge to one superframe timing in a very short time. Further, the results illustrated in FIG. 6 demonstrate that this synchronization technique scales well with increasing number of nodes.

This invention can be used to synchronize quiet periods in a cognitive radio network. Quiet periods are times when all cognitive radios (that are otherwise uncoordinated) become quiet so that out-of-network emitters, e.g. incumbent or primary users, can be detected reliably. This is referred to as "primary sharing." In addition, this synchronization mechanism can also be used for coexistence among secondary networks. Once otherwise uncoordinated neighboring networks are synchronized, they can exchange information, (e.g., coexistence beacons containing time and frequency usage) in order to share the common medium.

While the preferred embodiments of the present invention have been illustrated and described, it will be understood by those skilled in the art, the system, apparatus and method for synchronizing otherwise uncoordinated networks, as described herein, are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling with the scope of the appended claims.

We claim:

1. A synchronization system for wireless networks, comprising:

a plurality of uncoordinated wireless devices j configured to transmit a beacon in a beacon period having a beacon period start time BPST$_j$ and receive a beacon in a beacon period having a beacon period start time BPST$_i$ for all devices i, where devices i are not the same as devices j; and a beacon alignment apparatus for aligning BPST$_j$ to BPST$_i$ by performing an adjustment procedure by setting BPST$_j$ to BPST$_i$ if BPST$_j \in 1^{st}$ half of BPST$_i$ if BPST$_i \in 1^{st}$ half of BPST$_j$, incrementing a counter unique to the device i and trying to perform the adjustment procedure again; wherein if the counter reaches a predetermined maximum number of times without aligning BPST$_j$ to BPST$_i$ setting BPST$_j$ to a random number, wherein the beacon alignment apparatus is used by the device j whenever the device j receives a beacon from another device i of said plurality of uncoordinated wireless devices j and BPST$_j$ is not the same as BPST$_i$.

2. The system of claim 1, wherein the beacon period occurs at a beginning of a superframe.

3. The system of claim 1, wherein each device of said plurality is further configured to include an own beacon alignment apparatus.

4. The system of claim 3, wherein the beacon alignment apparatus is configured to include a synchronizer module to perform the adjustment procedure.

5. The system of claim 4, wherein the beacon period occurs at a beginning of a superframe.

6. A beacon alignment apparatus, comprising:

an antenna to transmit a beacon in a beacon period having a beacon period start time BPST$_j$ and receive a beacon of another wireless device i in another beacon period having a beacon period start time BPST$_i$;

a synchronization memory to store said received beacon;

a synchronizer module operably connected to said antenna to accept said received beacon therefrom and operably connected to said synchronization memory to store said accepted received beacon therein; the synchronizer module aligning BPST$_j$ to BPST$_i$ by performing an adjustment procedure by setting BPST$_j$ to BPST$_i$ if BPST$_j \in 1^{st}$ half of BPST$_i$; if BPST$_i \in 1^{st}$ half of BPST$_j$, incrementing a counter unique to the device i and trying to perform the adjustment procedure again; wherein if the counter reaches a predetermined maximum number of times without aligning BPST$_j$ to BPST$_i$, setting BPST$_j$ to a random number.

7. The apparatus of claim 6, wherein the beacon period occurs at a beginning of a superframe.

8. A method for synchronizing a plurality of uncoordinated wireless devices, comprising:

receiving a beacon in a beacon period having a beacon period start time $BPST_i$ from an uncoordinated wireless device i by another uncoordinated wireless device j that transmits an own beacon in a beacon period having a beacon period start time $BPST_j$, where device j is not the same as device i;

performing an adjustment by setting $BPST_j$ to $BPST_i$ if $BPST_j \in 1^{st}$ half of $BPST_i$;

if $BPST_j \in 1^{st}$ half of $BPST_i$, incrementing a counter unique to the device i and trying to perform the adjustment procedure again; wherein if the counter reaches a predetermined maximum number of times without aligning $BPST_j$ to $BPST_i$, setting $BPST_j$ to a random number; and transmitting an own beacon by device j in the beacon period having the beacon period start time $BPST_j$.

9. The method of claim 8, wherein the beacon period occurs at a beginning of a superframe.

* * * * *